US006130176A

United States Patent [19]
Lam

[11] Patent Number: 6,130,176
[45] Date of Patent: Oct. 10, 2000

[54] FIBROUS BASE MATERIAL FOR A FRICTION LINING MATERIAL COMPRISING LESS FIBRILLATED ARAMID FIBERS AND CARBON FIBERS

[75] Inventor: Robert C. Lam, Bensenville, Ill.

[73] Assignee: Borg-Warner Inc., Troy, Mich.

[21] Appl. No.: 09/183,564

[22] Filed: Oct. 30, 1998

Related U.S. Application Data

[63] Continuation-in-part of application No. 08/789,063, Jan. 28, 1997, Pat. No. 5,707,905, which is a continuation of application No. 08/535,788, Sep. 28, 1995, abandoned, which is a continuation-in-part of application No. 08/253,727, Jun. 3, 1994, Pat. No. 5,753,356, which is a continuation-in-part of application No. 08/101,951, Aug. 4, 1993, abandoned.
[60] Provisional application No. 60/068,107, Dec. 19, 1997.

[51] Int. Cl.$^7$ ............................ B32B 5/02; B05D 3/02
[52] U.S. Cl. ................ 442/101; 427/387; 427/389.9; 442/157; 442/161; 442/169; 442/176; 442/179; 442/417
[58] Field of Search ................ 442/101, 157, 442/161, 169, 176, 179, 417; 427/387, 389.9

[56] References Cited

U.S. PATENT DOCUMENTS

| | | | |
|---|---|---|---|
| 2,182,208 | 12/1939 | Nason et al. ................ 260/19 |
| 2,779,668 | 1/1957 | Daniels et al. ................ 51/298 |
| 3,215,648 | 11/1965 | Duffy et al. ................ 260/2.1 |
| 3,270,846 | 9/1966 | Arledter et al. ................ 192/107 |
| 3,746,669 | 7/1973 | Dummom et al. ................ 260/3 |
| 3,899,050 | 8/1975 | Savary et al. ................ 188/73.1 |
| 3,911,045 | 10/1975 | Hartmann et al. ................ 260/826 |
| 3,927,241 | 12/1975 | Augustin ................ 428/408 |
| 3,980,729 | 9/1976 | Yokokawa et al. ................ 260/826 |
| 4,020,226 | 4/1977 | Andrianov et al. ................ 428/290 |
| 4,051,097 | 9/1977 | Aldrich ................ 260/38 |
| 4,256,801 | 3/1981 | Chuluda ................ 428/280 |
| 4,259,397 | 3/1981 | Saito et al. ................ 428/288 |
| 4,320,823 | 3/1982 | Covaleski ................ 192/107 |
| 4,324,706 | 4/1982 | Tabe et al. ................ 523/149 |
| 4,352,750 | 10/1982 | Eschen ................ 523/156 |
| 4,373,038 | 2/1983 | Moraw et al. ................ 523/156 |
| 4,374,211 | 2/1983 | Gallagher et al. ................ 523/156 |
| 4,451,590 | 5/1984 | Fujimaki et al. ................ 523/155 |
| 4,456,650 | 6/1984 | Melotik et al. ................ 428/290 |
| 4,457,967 | 7/1984 | Chareire et al. ................ 428/212 |
| 4,514,541 | 4/1985 | Frances ................ 524/514 |
| 4,558,089 | 12/1985 | Koyama et al. ................ 428/367 |
| 4,563,386 | 1/1986 | Schwartz ................ 428/283 |
| 4,593,802 | 6/1986 | Danko, Jr. ................ 192/107 M |
| 4,628,001 | 12/1986 | Sasaki et al. ................ 428/367 |
| 4,646,900 | 3/1987 | Crawford et al. ................ 192/107 R |
| 4,656,203 | 4/1987 | Parker ................ 523/155 |
| 4,657,951 | 4/1987 | Takarada et al. ................ 523/153 |
| 4,663,230 | 5/1987 | Tennent ................ 428/367 |
| 4,663,368 | 5/1987 | Harding et al. ................ 523/155 |
| 4,672,082 | 6/1987 | Nakagawa et al. ................ 523/153 |
| 4,694,937 | 9/1987 | Jonas ................ 188/73.1 |
| 4,700,823 | 10/1987 | Winckler ................ 192/107 M |
| 4,743,634 | 5/1988 | Royer ................ 523/150 |
| 4,792,361 | 12/1988 | Double et al. ................ 106/97 |
| 4,918,116 | 4/1990 | Gardziella et al. ................ 523/149 |
| 4,983,457 | 1/1991 | Hino et al. ................ 428/367 |
| 5,004,497 | 4/1991 | Shibata et al. ................ 75/229 |
| 5,033,596 | 7/1991 | Genise ................ 192/53 |
| 5,080,969 | 1/1992 | Tokumura ................ 428/327 |
| 5,083,650 | 1/1992 | Seiz et al. ................ 192/107 |
| 5,093,388 | 3/1992 | Siemon, Jr. et al. ................ 523/149 |
| 5,290,627 | 3/1994 | Ikuta ................ 428/251 |
| 5,585,166 | 12/1996 | Kearsey . |

FOREIGN PATENT DOCUMENTS

| | | |
|---|---|---|
| 0180381A3 | 7/1986 | European Pat. Off. . |
| 0202145 | 11/1986 | European Pat. Off. . |
| 0669482A3 | 2/1995 | European Pat. Off. . |
| 2828918 | 1/1979 | Germany . |
| 4211010 | 10/1992 | Germany . |
| 58180573 | 10/1981 | Japan . |
| 59-103040 | 6/1984 | Japan . |
| 3150266 | 6/1991 | Japan . |
| 6299434 | 9/1994 | Japan . |
| 2224285A | 2/1990 | United Kingdom . |
| WO 95/26473 | 10/1995 | WIPO . |

OTHER PUBLICATIONS

A. Knop, W. Scheib, Chemistry and Application of Phenolic Resins, Springer–Verlag, Berlin Heidelberg, NY (1979), p. 230–232.
Artificial Graphite, Material Safety Data Sheet, prepared Jun. 7, 1991, U.S. Dept. of Labor.
AKZO, Material Safety Data Sheet, prepared Jul. 11, 1991 p. 1–4.
Jack J. Pigliacamp, Organic Fibers, pp. 54 & 55, E.I. Du Pont de Nemours & Company, Inc.
Freeness of Pulp, T 227 om–85, 1985 TAPPI.
European Search Report—dated Nov. 22, 1994 for EP 94 30 5407.
European Search Report—dated May 4, 1994 for EP 93 11 8967.
European Search Report—dated Dec. 19, 1996 for EP 96 30 6350.8.

*Primary Examiner*—Christopher Raimund
*Attorney, Agent, or Firm*—Emch, Schaffer, Schaub & Porcello; Greg Dziegielewski

[57] ABSTRACT

The present invention relates to a fibrous base material for use in a non-asbestos, non-metallic friction material comprising less fibrillated aramid fibers, carbon particles, cotton fibers, carbon fibers and at least one filler material, and the non-asbestos, non-metallic friction material produced therefrom. In certain embodiments, the fibrous base material is impregnated with a phenolic or phenolic-base resin material, including, for example, a mixture of a phenolic resin and a silicone resin.

20 Claims, 2 Drawing Sheets

FIBROUS BASE MATERIAL FOR A FRICTION LINING MATERIAL COMPRISING LESS FIBRILLATED ARAMID FIBERS AND CARBON FIBERS

TECHNICAL FIELD

This application is related to Provisional Patent Application Ser. No. 60/068,107 filed Dec. 19, 1997, which is a continuation-in-part of Ser. No. 08/789,063 filed Jan. 28, 1997, now U.S. Pat. No. 5,707,905, which is a file wrapper continuation application of Ser. No. 08/535,788 filed Sep. 28, 1995, now abandoned, which is a continuation-in-part of Ser. No. 08/253,727 filed Jun. 3, 1994, now U.S. Pat. No. 5,753,356, which is a continuation-in-part of Ser. No. 08/101,951 filed Aug. 4, 1993, now abandoned, all of which are expressly incorporated herein by reference.

The present invention relates to a non-asbestos, non-metallic fibrous base material comprising less fibrillated aramid fibers, cotton fibers, carbon fibers, carbon particles and a filler material, such as diatomaceous earth. The invention further relates to a composite friction material comprising the above described fibrous base material impregnated with a phenolic resin or a modified phenolic resin blend. In certain embodiments, at least one silicone resin is blended with at least one phenolic resin for use in impregnating a fibrous base material.

The friction material of the present invention has improved strength, porosity, wear resistance and noise resistance. The friction material of the present invention also has higher friction stability and thermal capability than conventional friction materials. The friction material is especially useful in high energy applications and noise free conditions.

BACKGROUND ART

New and advanced transmission systems and braking systems are being developed by the automotive industry. These new systems often involve high energy requirements. Therefore, the friction materials technology must be also developed to meet the increasing energy requirements of these advanced systems.

In particular, a new high energy type friction material is needed. The new high energy friction material must be able to withstand high speeds wherein surface speeds are up to about 65 m/seconds. Also, the friction material must be able to withstand high facing lining pressures up to about 1500 psi. It is also important that the friction material be useful under limited lubrication conditions.

The friction material must be durable and have high heat resistance in order to be useful in the advanced transmission and braking systems. Not only must the friction material remain stable at high temperatures, it must also be able to rapidly dissipate the high heat that is being generated during operating conditions.

The high speeds generated during engagement and disengagement of the new transmission and braking systems mean that a friction material must be able to maintain a relatively constant friction throughout the engagement. It is important that the frictional engagement be relatively constant over a wide range of speeds and temperatures in order to minimize "shuddering" of materials during braking or the transmission system during power shift from one gear to another. It is also important that the friction material have a desired torque curve shape so that during frictional engagement the friction material is noise or "squawk" free.

Previously, asbestos fibers were included in the friction material for temperature stability. For example, the Arledter et al. U.S. Pat. No. 3,270,846 patent describes phenolic and phenolic-modified resins used with asbestos. Now, however, due to health and environmental problems, asbestos is no longer being used. More recent friction materials have attempted to overcome the absence of the asbestos in the friction material by modifying impregnating paper or fiber materials with phenolic or phenolic-modified resins. These friction materials, however, do not rapidly dissipate the high heat generated, and do not have the necessary heat resistance and satisfactory high coefficient of friction performance now needed for use in the high speed systems currently being developed.

While phenolic resins have found use in friction materials for wet clutch applications, the phenolic resins have various limitations. The phenolic resin friction materials do not have the high heat resistance necessary for use with the new high energy transmission systems. In particular, the phenolic resins carbonize at a temperature of about 450° to 500° C. which is too low to be useful in high energy applications. In addition, phenolic resins are rigid materials and when the phenolic resins are used in a friction material, uneven lining wear and separator plate "hot spots" result.

Attempts to overcome the limitations and drawbacks of phenolic resin friction materials include the replacement of phenolic resins with other thermosetting resins. One attempt to produce friction materials involves the modification of a phenolic resin with various synthetic resins. One example, described in Takarada et al. U.S. Pat. No. 4,657,951, is a phenolic resin modified with an organopolysiloxane which is compression molded to form a friction material. The phenolic resin and organopolysiloxane are reacted together to effect a condensation reaction which is then distilled, solidified by cooling, and pulverized to obtain a powdered phenolic-modified resin. The powdered phenolic-modified resin was used in forming a compression molded friction material.

As far as is known, there is no disclosure of a friction material for use in transmission systems which includes a silicone material blended with a phenolic material and used to impregnate a friction paper.

While the Hartmann et al. U.S. Pat. No. 3,911,045 reference discusses a silicone material blended with phenolic resins for use as a compression molding composition, there is no disclosure or suggestion that a silicone material could successfully be blended with a resin material and used to impregnate a friction lining material. On the contrary, previous attempts to use silicone resins in friction materials have been unacceptable. A friction lining that is impregnated or saturated with a silicone resin has, in the past, demonstrated poor shear strength and delamination resistance. Further, friction materials saturated with a silicone resin are usually too elastic and therefore tests with undesirable friction and wear characteristics resulting. It is not surprising that molded friction lining compositions formed entirely of a phenol-formaldehyde resin-polysiloxane resin have not been used even though they are known, since such molded compositions do not have the necessary constant coefficient of friction characteristics and such friction materials fail under high energy and high heat conditions.

In order for friction materials to be useful in "wet" applications, the friction material must have a wide variety of acceptable characteristics. The friction material must be resilient or elastic yet resistant to compression set, abrasion and stress; have high heat resistance and be able to dissipate heat quickly; and, have long lasting, stable and consistent frictional performance. If any of these characteristics are not met, optimum performance of the friction material is not met.

Thus, it is also important that the impregnating resin be used with a suitable friction lining or fibrous base material to form a high energy application friction material. The friction material must have good shear strength both when saturated with the wet resin during impregnation and when saturated with brake fluid or transmission oil during use.

It is also important, under certain applications, that the friction material have high porosity such that there is a high fluid permeation capacity during use. Thus, it is important that the friction material not only be porous, it must also be compressible. The fluids permeated into the friction material must be capable of being squeezed or released from the friction material quickly under the pressures applied during operation of the brake or transmission, yet the lining material must not collapse. It is also important that the friction material have high thermal conductivity to also help rapidly dissipate the heat generated during operation of the brake or transmission.

In other friction materials, metallic fibers combined with carbon materials were included in the friction material for wear resistance. For example, Fujimaki et al. U.S. Pat. No. 4,451,590 describes a friction material having metallic fibers, filler, carbon particles, carbon fibers and phenolic resin. However, the metallic based friction materials do not have sufficient porosity and compressibility to be capable of high fluid permeation capacity during use. Also, the metallic based friction materials are not sufficiently resilient or elastic, yet resistant to compression set to be capable of withstanding high facing lining pressures of up to about 1500 psi (approximately 105 kg/cm$^2$). The metallic based friction material also is not capable of withstanding high surface speeds of up to about 65 m/second which are generated during engagement and disengagement of the new transmission and braking systems.

Other recent friction materials have attempted to overcome the absence of asbestos fibers by including cellulose or aramid-type pulp or fibers. These aramid-type fibers, however, have relatively fibrillated surfaces which allow the fibers to become closely entangled in a friction paper. The entangled fibers cause the resulting friction paper to be dense and have less than the desired porosity needed for the new high energy transmission systems.

The present invention is an improvement over the friction material disclosed in copending application U.S. Ser. No. 08/789,063 filed Jan. 28, 1997, now U.S. Pat. No. 5,707,905, which contains synthetic graphite and no carbon fibers or activated carbon particles. The present invention has better noise or squawk resistance due to the presence of carbon fibers.

As far as is known, there is no disclosure of a friction material for use in transmission systems which includes an aramid-type fiber which is less fibrillated than currently available aramid fibers in combination with carbon fibers, cotton fibers, and carbon particles.

Accordingly, it is an object of the present invention to provide an improved friction material with reliable and improved properties compared to those of the prior art.

A further object of this invention is to provide friction materials with high thermal conductivity, porosity strength, and noise resistance.

As a result of extensive research in view of the need for a better friction material, a friction material with improved characteristics has been developed by the invention. The present wet friction material is useful in "wet" applications where the friction material is "wetted" or impregnated with a liquid such as brake fluid or automatic transmission fluid during use. During use of the "wet" friction material, the fluid is ultimately squeezed from or is impregnating the friction material. Wet friction materials differ greatly, both in their compositions and physical characteristics from "dry" friction materials.

DISCLOSURE OF THE INVENTION

In order to achieve the requirements discussed above, many materials were evaluated for friction and heat resistant characteristics under conditions similar to those encountered during operation. Both commercially available brake linings and transmission materials were investigated and proved not to be suitable for use in high energy applications.

The present invention is especially useful in brakes and in clutch applications. The present invention provides a fibrous base material comprising less fibrillated aramid fibers, cotton fibers, carbon fibers, carbon particles and at least one filler material and, optionally, other ingredients.

The less fibrillated aramid fibers create a porous fibrous base material. The carbon fibers provide the friction material good heat conduction such that the friction material has desired heat resistance. The carbon particles also provides the friction material with good friction characteristics such as a good or smooth "feel" in shift and essentially noise or "squawk" free operation of the brakes and clutches. The presence of a small amount of cotton fibers provides the friction material with desired "break-in" characteristics such that there is little or no shudder occurring during the initial use of the friction material.

The fibrous base material can be impregnated using different resin systems. In certain embodiments, it is useful to impregnate the fibrous based material with a phenolic resin or a modified phenolic-based resin. In certain embodiments, when a silicone resin is blended or mixed with a phenolic resin in compatible solvents and that silicone-phenolic resin blend is used to impregnate a fibrous base material of the present invention, an especially useful high energy friction material is formed. Such high energy friction material has high friction stability and high heat resistance.

The friction material of the present invention prevents uneven lining wear and therefore the formation of separator plate "hot spots" from developing during the useful life of the friction material. When there is little uneven wear on the friction material, there is more likelihood to maintain "steady state" of the clutch or brake components and therefore, more consistent performance of the clutch and brake. Further, the friction material of the present invention shows good shear strength such that the friction material resists delamination during use.

BEST MODE OF CARRYING OUT THE INVENTION

Figure 1:
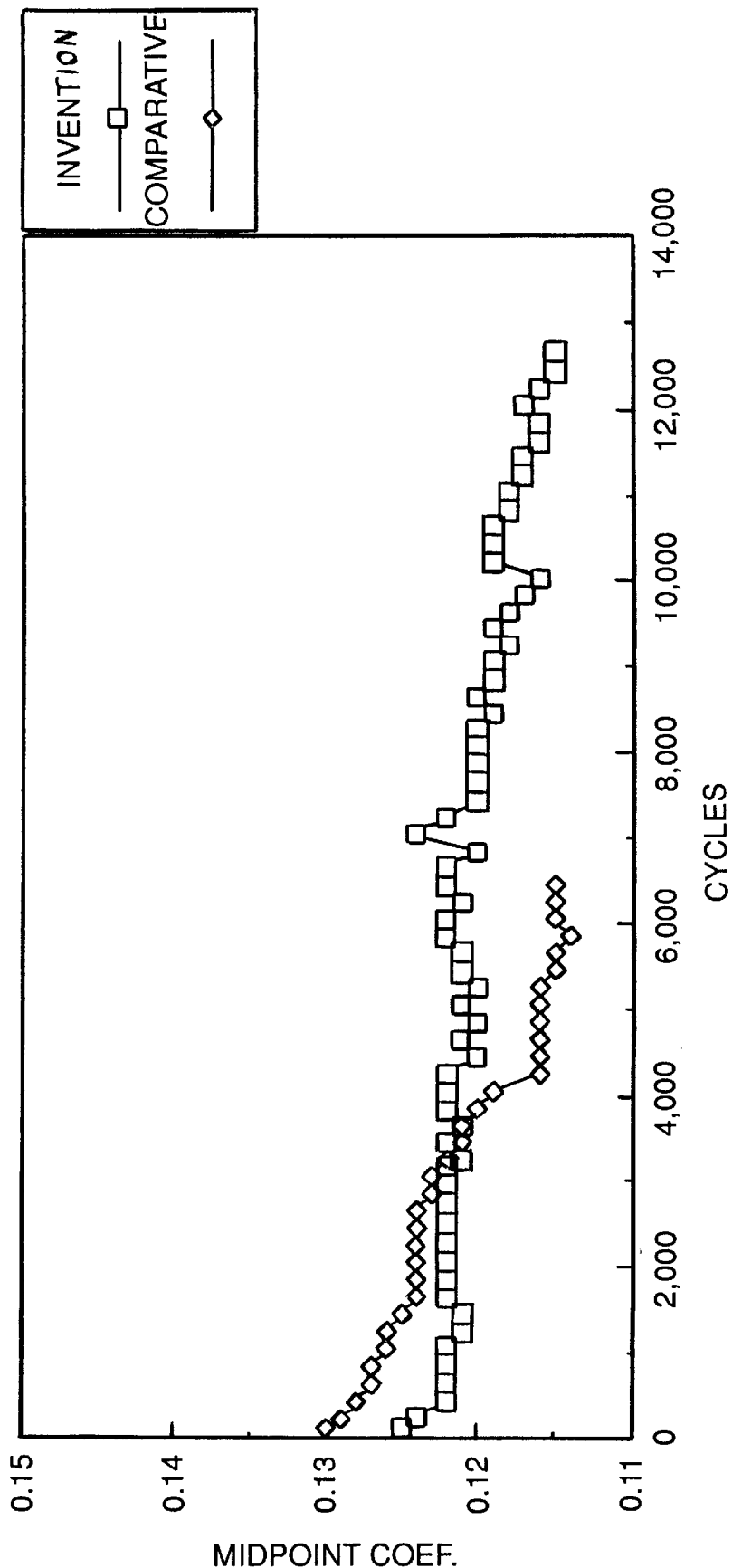
FIG. 1 is a graph showing the torque curve of a friction material of the present invention.

Various resins useful with the present invention include phenolic resins and phenolic-based resins. It is to be understood that various phenolic-based resins which include in the resin blend other modifying ingredients, such as epoxy, butadiene, silicone, tung oil, benzene, cashew nut oil and the like, are contemplated as being useful with the present invention. In the phenolic-modified resins, the phenolic resin is generally present at about 50% or greater by weight (excluding any solvents present) of the resin blend. However, it has been found that friction materials, in certain embodiments, can be improved when the impregnant resin blend contains about 5 to about 80%, by weight, and for certain purposes, about 15 to about 55%, and in certain embodiments about 15 to about 25%, by weight, of silicone resin based on the weight of the silicone-phenolic mixture (excluding solvents and other processing acids).

Silicone resins useful in the present invention include, for example, thermal curing silicone sealants and silicone rubbers. Various silicone resins are useful with the present invention. One resin, in particular, comprises xylene and acetylacetone (2,4-pentanedione). The silicone resin has a boiling point of about 362° F. (183° C.), vapor pressure at 68° F. mm, Hg: 21, vapor density (air=1) of 4.8, negligible solubility in water, specific gravity of about 1.09, percent volatile, by weight, 5% evaporation rate (ether=1), less than 0.1, flash point about 149° F. (65° C.) using the Pensky-Martens method. It is to be understood that other silicone resins can be utilized with the present invention. Other useful resin blends include, for example, a suitable phenolic resin comprises (% by wt.): about 55 to about 60% phenolic resin; about 20 to about 25% ethyl alcohol; about 10 to about 14% phenol; about 3 to about 4% methyl alcohol; about 0.3 to about 0.8% formaldehyde; and, about 10 to about 20% water. Another suitable phenolic-based resin comprises (% by wt.): about 50 to about 55% phenol/formaldehyde resin; about 0.5% formaldehyde; about 11% phenol; about 30 to about 35% isopropanol; and, about 1 to about 5% water.

It has also been found that another useful resin is an epoxy modified phenolic resin which contains about 5 to about 25 percent, by weight, and preferably about 10 to about 15 percent, by weight, of an epoxy compound with the remainder (excluding solvents and other processing aids) phenolic resin. The epoxy-phenolic resin compound provides, in certain embodiments, higher heat resistance to the friction material than the phenolic resin alone.

In certain embodiments, it is preferred that the target pick up of resin by the fibrous base material range from about 40 to about 65%, and, in certain embodiments, about 60 to at least 65%, by weight, total silicone-phenolic resin. After the fibrous base material is impregnated with the resin, the fibrous base material is cured for a period of time (in certain embodiments for about ½ hour) at temperatures ranging between 300–400° C. to cure the resin binder and form the friction material. The final thickness of the friction material depends on the initial thickness of the fibrous base material and, in certain embodiments, preferably ranges from about 0.014" to about 0.040".

It further contemplated that other ingredients and processing aids known to be useful in both preparing resin blends and in preparing impregnating fibrous-based materials can be included in the friction materials.

For the embodiments where a phenolic resin and silicone resin are used, no new compound is formed when the silicone resin and phenolic resin are blended together. Table 1 shows the prominent FT-IR peaks in wave numbers for a cured silicone resin, a cured phenolic resin, and about 50/50 blend of silicone resin and phenolic resin which has been cured. As can be seen, no new peaks occur in the 50/50 silicone-phenolic blend, and the peaks that are present reflect the presence of both the silicone resin and the phenolic resin. Thus, it is shown that the resins cure separately and that no new compound is formed.

TABLE 1

| PROMINENT FT-IR PEAKS IN WAVENUMBERS | | |
|---|---|---|
| SILICONE RESIN | PHENOLIC RESIN | 50/50 BLEND |
| — | 3364 | 3366 |
| 2966 | — | 2964 |
| — | 1510 | 1510 |
| — | 1479 | 1481 |
| 1412 | — | 1410 |
| 1271 | — | 1261 |
| 798 | — | 800 |
| 767 | — | 769 |

Both the silicone resin and the phenolic resin are present in solvents which are compatible to each other. These resins are mixed together (in preferred embodiments) to form a homogeneous blend and then used to impregnate a fibrous base material. There is not the same effect if a fibrous base material is impregnated with a phenolic resin and then a silicone resin is added thereafter or vice versa. There is also a difference between a mixture of a silicone-phenolic resin solution, and emulsions of silicone resin powder and/or phenolic resin powder. When silicone resins and phenolic resins are in solution they are not cured at all. In contrast, the powder particles of silicone resins and phenolic resins are partially cured. The partial cure of the silicone resins and the phenolic resins inhibits a good impregnation of the fibrous base material.

In certain embodiments of the present invention, the fibrous base material is impregnated with a blend of a silicone resin in a solvent which is compatible with the phenolic resin and its solvent. In one embodiment, isopropanol has been found to be an especially suitable solvent. It is to be understood, however, that various other suitable solvents, such as ethanol, methyl-ethyl ketone, butanol, isopropanol, toluene and the like, can be utilized in the practice of this invention. The presence of a silicone resin, when blended with a phenolic resin and used to impregnate a fibrous base material, causes the resulting friction materials to be more elastic than fibrous base materials impregnated only with a phenolic resin. When pressures are applied to the silicone-phenolic resin blended impregnated friction material of the present invention, there is a more even distribution of pressure which, in turn, reduces the likelihood of uneven lining wear. After the silicone resin and phenolic resin are mixed together, the mixture is used to impregnate a fibrous base material.

Greater elasticity of the friction material allows for more uniform heat dissipation during use of the friction material since the fluid in the transmission or brake can rapidly move through the porous structure of the friction material. Further, the increased elasticity provides more uniform pressure or even pressure distribution on the friction material such that uneven lining wear or separator plate "hot spots" are eliminated.

The friction material of the present invention has high durability and high delamination resistance. The shear strength (psi) for the friction material of the present invention is greater than for conventional friction materials. The use of the less fibrillated fibers and carbon fibers provides a pore structure to the friction material which, in turn, provides increased thermal resistance to the friction material. The fiber geometry not only provides increased thermal resistance, but also provides delamination resistance and squeal or noise resistance. The presence of the carbon fibers and carbon particles aids in increasing the thermal resistance, maintaining a steady coefficient of friction and increasing the squeal resistance.

Various methods for impregnating materials can be practiced with the present invention. The fibrous base material is impregnated with the phenolic or modified phenolic resin, preferably so that the impregnating resin material comprises about 45 to about 65 parts, by weight, per 100 parts, by weight, of the friction material. After the fibrous base material has been impregnated with the resin, the impregnated fibrous base material is heated to a desired temperature for a predetermined length of time to form the friction material. The heating cures the phenolic resin at a temperature of about 300° F. When other resins are present, such as a silicone resin, the heating cures the silicone resin at a temperature of about 400° F. Thereafter, the impregnated and cured friction material is adhered to the desired substrate by suitable means.

Another aspect of the present invention relates to a fibrous base material comprising less fibrillated aramid fibers, carbon particles, cotton fibers, carbon fibers, and at least one filler material, which are combined to form a paper-like fibrous base material. It is to be understood that various methods of forming fibrous base materials are contemplated as being useful in preparing the fibrous base material of the present invention. It has been found by the inventor herein that the use of less fibrillated aramid fibers and carbon fibers in a fibrous base material improves the friction material's ability to withstand high temperatures. It has also been found by the herein that a relatively low amount of cotton fibers in the fibrous base material improves the friction material's clutch "break-in" characteristics.

While various friction lining materials disclose the use of aramid fibers, it has not been known until the present invention to provide a friction material comprising less fibrillated aramid fibers which generally have few fibrils attached to a core fiber. The use of the less fibrillated aramid fibers provides a friction material having a more porous structure; i.e., there are more and larger pores than if a typical fibrillated aramid fiber is used. The porous structure is generally defined by the pore size and liquid permeability. In a preferred embodiment, the fibrous base material defines pores ranging in mean average size from about 2.0 to about 15 microns in diameter. In certain embodiments, the mean pore size ranges from about 2.5 to about 4 microns in diameter and the friction material had readily available air voids of at least about 50% and in certain embodiments at least about 60% or higher.

The higher mean flow pore diameter and permeability indicate that the friction material is more likely to run cooler or with less heat generated in a transmission due to better automatic transmission fluid flow of material throughout the porous structure of the friction material. During operation of a transmission system, oil deposits on the surface of a friction material tend to develop over time due to a breakdown of the automatic transmission fluid, especially at high temperatures. The oil deposits on the fibers decrease the pore openings. Therefore, when a friction material initially starts with larger pores, there are more open pores remaining during the useful life of the friction material. In addition, in embodiments at least partially impregnated with a silicone resin, the silicone resin, due its elastic characteristics, allows the fibers in the friction lining to have a more open structure.

The length of the less fibrillated fiber ranges from about 0.5 to about 6 mm and has a Canadian Standard Freeness (CSF) of greater than about 450 and in certain embodiments, about 500 to about 550 and in other certain embodiments, about 580–640 and most preferably about 620–640. In contrast, more fibrillated fibers, such as aramid pulp, have a freeness of about 285–290.

The "Canadian Standard Freeness" (T227 om-85) means that the degree of fibrillation of fibers can be described as the measurement of freeness of the fibers. The CSF test is an empirical procedure which gives an arbitrary measure of the rate at which suspension of three grams of fibers in one liter of water may be drained. Therefore, the less fibrillated aramid fibers have higher freeness or higher rate of drainage of fluid from the friction material than other aramid fibers or pulp. It has now been surprisingly found that friction materials comprising the aramid fibers having a CSF ranging from about 530–650, preferably about 580–640, and most preferably about 620–640, provide superior friction performance and have better material properties than friction materials containing conventionally more fibrillated aramid fibers. It has surprisingly been found that the longer fiber length, together with the high Canadian freeness, provide a friction material with high strength, high porosity and good wear resistance. The less fibrillated aramid fibers (CSF about 580–640) have especially good long-term durability and stable coefficients of friction.

The more porous the structure of the friction material, the more efficient is the heat dissipation. The oil flow in and out of the friction material during engagement of the friction material during use occurs more rapidly when the friction material is porous.

It has not been known until the present invention to include carbon particles and carbon fibers in a fibrous base material comprising less fibrillated aramid fibers. The use of the carbon particles and carbon fibers in the fibrous base material provides a three dimensional structure to the fibrous base material. It has further been discovered that the less fibrillated fibers, carbon particles, carbon fibers and filler improve the pore structure of the fibrous base material so that there are more porous openings throughout the fibrous base material. The increased porosity also increases the elasticity of the friction material. A lower degree of fibrillation of the less fibrillated aramid fibers results in a friction material having a more porous structure.

In certain embodiments, it is preferred that the size and geometry of the carbon particles be in the about 20 to about 50 micron size range. In these certain embodiments, it has been discovered that if the carbon particle size is too large or too small, there is not the optimum three-dimensional structure and consequently the heat resistance is not as optimum.

Various fillers are also used in the fibrous base material of the present invention. In particular, silica fillers, such as diatomaceous earth, are useful. However, it is contemplated that other types of fillers are suitable for use in the present invention and that the choice filler depends on the particular requirements of the friction material.

Cotton fiber is added to the fibrous base material of the present invention to give the fibrous material higher coefficients of friction. In certain embodiments, about 5 to about 20%, and in certain embodiments about 10% cotton can also be added to the fibrous base material.

One example of a formulation for a fibrous base material comprises about 10 to about 50%, by weight, of a less fibrillated aramid fiber; about 10 to about 35%, by weight, of activated carbon particles; about 5 to about 20%, by weight, cotton fibers, about 2 to about 15%, by weight, carbon fibers; and, about 10 to about 35%, by weight, of a filler material. In certain embodiments, one particular formulation has found to be useful comprises about 35 to about 45%, by weight, less fibrillated aramid fibers: about 10 to about 20%, by weight, activated carbon particles; about 5 to about 15% cotton fibers; about 2 to about 10%, by weight, carbon fibers; and, about 25 to about 35%, by weight, filler.

The following examples provide further evidence that the fibrous base material and friction material of the present invention are an improvement over the conventional friction materials. Various preferred embodiments of the invention are described in the following examples, which however, are not intended to limit the scope of the invention.

FIG. 1 shows the mid point coefficient of friction for the friction material of the present invention and a comparative high energy friction material. The fibrous base material comprises about 40%, by weight, less fibrillated aramid fibers; about 15%, by weight, carbon particles; about 10%, by weight, cotton fibers; about 5%, by weight, carbon fibers; and, about 30%, by weight filler material. The coefficient of friction for the friction material of the present invention remains relatively steady as the cycles increase, thus showing the high friction stability of the friction material. There is no fall off of coefficient of friction as the number of cycles increases for the fibrous base material of the present invention. Also, the relatively steady coefficient of friction indicates the friction material of the present invention very stable.

Figure 2:
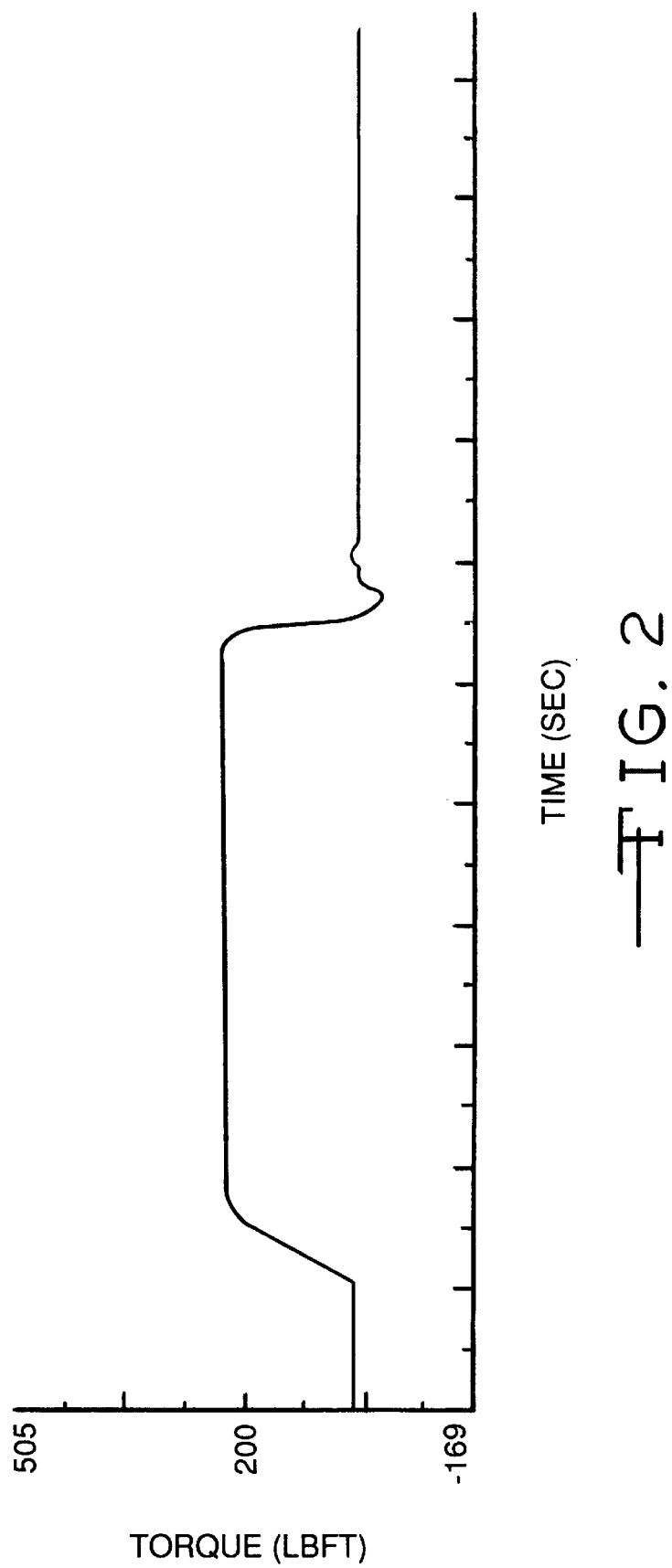
FIG. 2 is a graph showing the midpoint coefficient of friction as the number of cycles increases for a friction material of the present invention as compared to a comparative friction material.

FIG. 2 shows the torque curve shape which indicates that the friction material of the present invention is especially useful in high speed, high energy and high temperature applications. The stable torque curve also shows that the friction material of the present invention is noise free.

As can be seen, the friction material of the present invention performs consistently better than the comparative material. Thus, the fibrous base material of the present invention performs much better at higher speeds than the comparative material.

Table 2 below shows that the friction material of the present invention has good noise or squawk resistance and meets the end use customer's needs.

SQUAWK DATA TEST SUMMARY
Test Procedure: 961A
Fluid: B Oil
Machine: Full Pack

| Lot # | No. of Tests | No. of Cycles | Acceptable |
| --- | --- | --- | --- |
| #1 | 2 | 200 | Yes |
| #2 | 2 | 200 | Yes |
| #3 | 2 | 2 | Yes |
| 3 Material Lots | 6 Tests | 200 cycles/lot | Yes |

INDUSTRIAL APPLICABILITY

The present invention is useful as a high energy friction material for use with clutch plates, transmission bands, brake shoes, synchronizer rings, friction disks or system plates.

The above descriptions of the preferred and alternative embodiments of the present invention are intended to be illustrative and are not intended to be limiting upon the scope and content of the following claims.

I claim:

1. A fibrous base material for use in a non-asbestos, non-metallic friction material comprising a plurality of less fibrillated aramid fibers having a freeness of at least about 530 on the Canadian Standard Freeness (CSF) index, cotton fibers, carbon fibers, carbon particles, and, at least one filler material.

2. The fibrous base material of claim 1, wherein the less fibrillated aramid fiber and carbon fibers are present in amounts sufficient to provide high heat resistance and substantially uniform coefficient of friction to the friction material.

3. The fibrous base material of claim 1, wherein the less fibrillated aramid fibers have a freeness about 580–640 on the Canadian Standard Freeness index.

4. The fibrous base material of claim 1, wherein the less fibrillated aramid fibers have average fiber lengths in the range of 0.5 mm to 6 mm.

5. The fibrous base material of claim 1, wherein the filler comprises diatomaceous earth.

6. The fibrous base material of claim 1, wherein the fibrous base material defines pores ranging in mean average size from about 2.0 to about 15 microns in diameter.

7. The fibrous base material of claim 1, wherein the non-asbestos, non-metallic friction material has readily available air voids of at least about 50%.

8. The fibrous base material of claim 1 comprising about 10 to about 50%, by weight, less fibrillated aramid fiber; about 10 to about 35%, by weight, carbon particles; about 5 to about 20%, by weight, cotton fibers; about 2 to about 15%, by weight, carbon fibers; and, about 10 to about 35%, by weight, filler material.

9. The fibrous base material of claim 8 comprising in percent, by weight, about 40% less fibrillated aramid fibers, about 15% carbon particles; about 10% cotton fibers; about 5% carbon fibers; and about 30% filler material.

10. A non-asbestos friction material comprising the fibrous base material of claim 1 impregnated with a phenolic resin or a modified phenolic resin.

11. The friction material of claim 10, wherein the modified phenolic resin comprises an epoxy phenolic resin.

12. The friction material of claim 10, wherein the friction material comprises approximately 40 to about 60% resin, by weight.

13. A process for producing a non-asbestos friction material comprising mixing a phenolic resin with a silicone resin, impregnating the fibrous base material of claim 1 with the silicone-phenolic resin mixture, and thereafter heating the impregnated fibrous base material to cure the phenolic resin and the silicone resin.

14. A non-asbestos, non-metallic friction material comprising the fibrous base material of claim 1 impregnated with a mixture of a phenolic resin and a silicone resin wherein the amount of silicone resin in the mixture ranges from approximately 5 to approximately 80%, by weight, based on the weight of the mixture, the friction material exhibiting high heat resistance and substantially uniform coefficient of friction.

15. The friction material of claim 14, wherein the phenolic resin is present in a solvent material and the silicone resin is present in a solvent material which is compatible with the solvent material of the phenolic resin.

16. The friction material of claim 14, wherein the amount of silicone resin present in the silicone-phenolic resin mixture ranges from about 20 to about 25%, by weight, based on the weight of the mixture.

17. The friction material of claim 14, wherein the amount of silicone resin present in the silicone phenolic resin mixture ranges from about 15 to about 25%, by weight, based on the weight of the mixture.

18. The friction material of claim 11, wherein the amount of epoxy resin present in the epoxy phenolic resin ranges from about 5 to about 25%, by weight, based on the weight of the epoxy phenolic resin.

19. The friction material of claim 11, wherein the amount of epoxy resin present in the epoxy phenolic resin ranges from about 10 to about 15%, by weight, based on the weight of the epoxy phenolic resin.

20. A process for producing a non-asbestos, non-metallic friction material comprising mixing less fibrillated aramid fibers having a freeness of at least about 530 on the Canadian Standard Freeness (CSF) index with carbon particles, cotton fibers, carbon fibers, and at least one filler to form a fibrous base material, impregnating the fibrous base material with a phenolic resin or modified phenolic resin, and thereafter curing the impregnated fibrous base material at a predetermined temperature for a predetermined period of time.

* * * * *